United States Patent
Kim

(10) Patent No.: US 7,038,753 B2
(45) Date of Patent: May 2, 2006

(54) LIQUID CRYSTAL DISPLAY DEVICE FOR PREVENTING LIGHT LEAKAGE AND METHOD OF FABRICATING THE SAME

(75) Inventor: Kwang Min Kim, Daejeon (KR)

(73) Assignee: LG.Philips LCD.Co., Ltd., Seoul (KR)

( * ) Notice: Subject to any disclaimer, the term of this patent is extended or adjusted under 35 U.S.C. 154(b) by 47 days.

(21) Appl. No.: 10/869,028

(22) Filed: Jun. 17, 2004

(65) Prior Publication Data

US 2005/0007534 A1    Jan. 13, 2005

(30) Foreign Application Priority Data

Jun. 20, 2003  (KR) ..................... 10-2003-0040368

(51) Int. Cl.
*G02F 1/1343* (2006.01)

(52) U.S. Cl. ....................... 349/139; 349/54
(58) Field of Classification Search ............... 349/139, 349/54

See application file for complete search history.

(56) References Cited

U.S. PATENT DOCUMENTS 5,132,819 A * 7/1992 Noriyama et al. ............ 349/55
5,648,826 A * 7/1997 Song et al. .................... 349/42
6,100,948 A * 8/2000 Kim et al. ..................... 349/39
6,313,889 B1 * 11/2001 Song et al. .................... 349/54

FOREIGN PATENT DOCUMENTS

KR    1020010047907 A    6/2001
KR    1020010064401 A    7/2001

* cited by examiner

*Primary Examiner*—Toan Ton
(74) *Attorney, Agent, or Firm*—McKenna Long & Aldridge LLP

(57) ABSTRACT

An LCD device and a method of fabricating the same are to prevent a light leakage phenomenon of the edge of a pixel and thereby to improve a picture quality. The liquid crystal display device includes a plurality of gate lines and data lines defining a plurality of pixel regions, a switching device formed at a crossing region between each gate line and data line, a pixel electrode formed in the pixel region, a gate dummy line at one side of the pixel electrode along the data line and partially overlapping the pixel electrode, and a data dummy line at one side of the pixel electrode above the gate dummy line and partially overlapping with the pixel electrode.

9 Claims, 6 Drawing Sheets

LIQUID CRYSTAL DISPLAY DEVICE FOR PREVENTING LIGHT LEAKAGE AND METHOD OF FABRICATING THE SAME

This application claims the benefit of Korean Patent Application No. 2003-040368, filed on Jun. 20, 2003, which is hereby incorporated by reference for all purposes as if fully set forth herein.

BACKGROUND OF THE INVENTION

1. Field of the Invention

The present invention relates to a liquid crystal display (LCD) device, and more particularly, to an LCD device capable of improving picture quality by preventing light leakage by arranging a data dummy line, and a method of fabricating the same.

2. Discussion of the Related Art

Recently as information has become more available, displays have become more and more important as a visual information presentation media. Going forward to the future, displays need to have low power consumption, be thin and light, have a high picture quality, etc. Liquid crystal display (LCD) devices are equipped with not only functions to satisfy these conditions but are also easily mass produced, so that each kind of new LCD device may be quickly commercialized resulting in LCD devices replacing cathode ray tubes (CRT).

A general LCD device displays an image by controlling an optical transmittance ratio of a liquid crystal using an electric field. To this end, the LCD device is composed of a color filter substrate, an array substrate, and a liquid crystal material layer formed between the color filter substrate and the array substrate.

FIG. 1 is a plan view showing a part of the array substrate of a general LCD device.

As shown in FIG. 1, the array substrate 10 includes a gate line 16n and a data line 17 defining a pixel region by being arranged horizontally and vertically, a thin film transistor (TFT) 20 located at the crossing region between the gate line 16n and the data line 17 and acts as a switching device, and a pixel electrode 18 formed at each pixel region.

The TFT 20 includes of a gate electrode 21 connected to the gate line 16n, a source electrode 22 connected to the data line 17, and a drain electrode 23 connected to the pixel electrode 18. In addition, the TFT 20 includes a first insulating layer (not shown) for insulating the gate electrode 21 and the source/drain electrodes 22 and 23, and a semiconductor layer (not shown) for forming a conductive channel between the source electrode 22 and the drain electrode 23 by a gate voltage supplied to the gate electrode 21.

The drain electrode 23 is electrically connected to the pixel electrode 18 of the pixel region through a first contact hole 24 formed in a second insulating layer (not shown).

Generally, the pixel electrode of the array substrate forms a liquid crystal capacitor with a common electrode of a color filter substrate. A voltage applied to the liquid crystal capacitor is not maintained until the next signal is introduced, but instead leaks, thus disappearing. Therefore, in order to maintain the applied voltage, a storage capacitor has to be connected to the liquid crystal capacitor.

The storage capacitor not only maintains the signal voltage but also stabilizes the gray scale display and reduces flicker and a residual image.

A parasitic capacitance (Cgs) results in an overlapped area between the gate electrode and the source/drain electrode. The pixel voltage is varied as much as $\Delta V$ due to the parasitic capacitance, which is called a level shift voltage or a kickback voltage and can be expressed as the following formula 1.

$$\Delta V = Cgs/(Cgs+Clc+Cst) \times \Delta Vg \qquad \text{[Formula 1]}$$

Herein, $\Delta Vg$ denotes Vghigh-Vglow, Clc denotes a capacitance of a liquid crystal capacitor, and Cst denotes a capacitance of a storage capacitor.

A characteristic of the liquid crystal varies when a direct current voltage is applied to the liquid crystal in one direction for a long time. Therefore, a polarity of an applied voltage has to be periodically changed at the time of driving liquid crystal. A direct current component due to an asymmetrical structure of a positive polarity (+) and a negative polarity (−) remains as indicated by the $\Delta V$, thereby causing a flicker of a screen, a residual image, an uneven brightness, etc.

According to this, by introducing an storage capacity Cst, the size of the $\Delta V$ is reduced thus to improve a picture quality.

The storage capacitor can be formed by two methods. First, an electrode for a storage capacitor is additionally formed and is connected to a common electrode thus to be used as the storage capacitor. Second, a part of the n−1th gate line is used as an electrode of a storage capacitor of the nth pixel. Herein, the former is called as a storage on common (SOC) method or an independent storage capacitor method, and the latter is called as a storage on gate (SOG) or a previous gate method.

In the LCD device shown in FIG. 1, the storage capacitor is formed by using a storage on gate method. That is, the pixel electrode 18 of the nth pixel and a part of the previous gate line 16n−1 which is the n−1th gate line (that is, a first storage electrode) are overlapped thus to form a storage capacitor 30 with the first insulating layer in between. The pixel electrode 18 of the nth pixel is connected to a second storage electrode 33 through a second contact hole 34 formed at the second insulating layer, thereby forming the first storage electrode and the storage capacitor.

As the LCD device becomes larger, the capacitance of the storage capacitor has to increase in order to stably maintain the pixel voltage. However, using the aforementioned LCD device, increasing the capacitance of the storage capacitor is limited.

For a passivation layer of the array substrate, an inorganic insulating layer having a great dielectric constant such as SiNx or a SiO2 is used. The pixel electrode and the data line having the inorganic insulating layer therebetween have to maintain a horizontal interval of 3~5 μm in order to minimize a coupling effect due to the parasitic capacitor. As a result, light leaks through a gap between the data line and the pixel electrode thus lowering the picture quality of the LCD device.

In order to shield light that causes picture quality degradation, the width of a black matrix formed on the color filter substrate has to be increased to shield the light leakage region. However, when the pixel pitch is increased and a large substrate is used, the width of the black matrix has to be designed with greater consideration of deviations during the attachment process. As a result, the aperture ratio of the LCD device decreases.

SUMMARY OF THE INVENTION

Accordingly, the present invention is directed to a device and method fabricating the same that substantially obviates one or more of the problems due to limitations and disadvantages of the related art.

An advantage of the present invention is to provide an LCD device and method of fabricating the same capable of improving a picture quality by preventing a light leakage by forming a data dummy line between a gate dummy line and a pixel electrode.

Another advantage of the present invention is to provide an LCD device and method of fabricating the same capable of increasing a capacitance of a storage capacitor by using a data dummy line as a storage electrode by electrically connecting the data dummy line to a pixel electrode.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

To achieve these and other advantages and in accordance with the purpose of the present invention, as embodied and broadly described herein, there is provided an LCD device including a plurality of gate lines and data lines defining a plurality of pixel regions, a switching device formed at a crossing region between each gate line and data line, a pixel electrode formed in the pixel region, a gate dummy line at one side of the pixel electrode along the data line and partially overlapping the pixel electrode, and a data dummy line at one side of the pixel electrode above the gate dummy line and partially overlapping with the pixel electrode.

According to another aspect, the LCD device includes a plurality of gate lines and a plurality of data lines defining a plurality of pixel regions, a switching device formed at a crossing region between each gate line and data line, a pixel electrode formed in the pixel region, a gate dummy line along the data line forming a storage capacitor with the pixel electrode, and a data dummy line excluding a horizontal electric field formed between the gate dummy line and the pixel electrode.

To achieve these and other advantages and in accordance with the purpose of the present invention, as embodied and broadly described herein, there is also provided a method of fabricating an LCD device including preparing a substrate, forming a gate line and a gate dummy line on the substrate, forming a first insulating layer on the substrate, forming a data line, a data dummy line, and a storage electrode on the first insulating layer, forming a second insulating layer on the substrate, the second insulating layer having a first contact hole that partially exposes the data dummy line and a second contact hole that partially exposes the storage electrode, and forming a pixel electrode connected to the data dummy line through the first contact hole and connected to the storage electrode through the second contact hole.

It is to be understood that can be foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

The present invention provides an LCD device and method of fabricating the same capable of improving picture quality by preventing light leakage.

The reason why light leaks at the edge of a pixel electrode in the LCD device is explained below.

A part of the light from a back light positioned behind the LCD device passes through a disclination region of a liquid crystal layer and creates an abnormal picture quality. The disclination region is that the boundary of two regions where an arrangement of a liquid crystal molecule is discontinuously changed.

Because the LCD device has many lines such as gate lines, data lines, and storage capacitor lines, a horizontal electric field and a vertical electric field are simultaneously formed due to a voltage difference between the lines when a signal is applied thereto. The horizontal electric field mainly causes the disclination, whereby light leaks at the edge of the pixel electrode.

The gate dummy line at a lower portion of the pixel electrode partially overlaps with the pixel electrode and forms a horizontal electric field between the pixel electrode causing the light leakage at the edge of the pixel electrode.

In order to prevent light leakage, an LCD device having a structure for reducing the horizontal electric field that causes the disclination is required.

In the LCD device of the present invention, a data dummy line is formed between the pixel electrode and the gate dummy line. Accordingly, the component of the horizontal electric field that the gate dummy line influences on the pixel electrode is reduced thus preventing the light leakage phenomenon.

Hereinafter, embodiments of the LCD device and the method of fabricating the same of the present invention will be explained in more detail with reference to the attached drawings.

Figure 1:
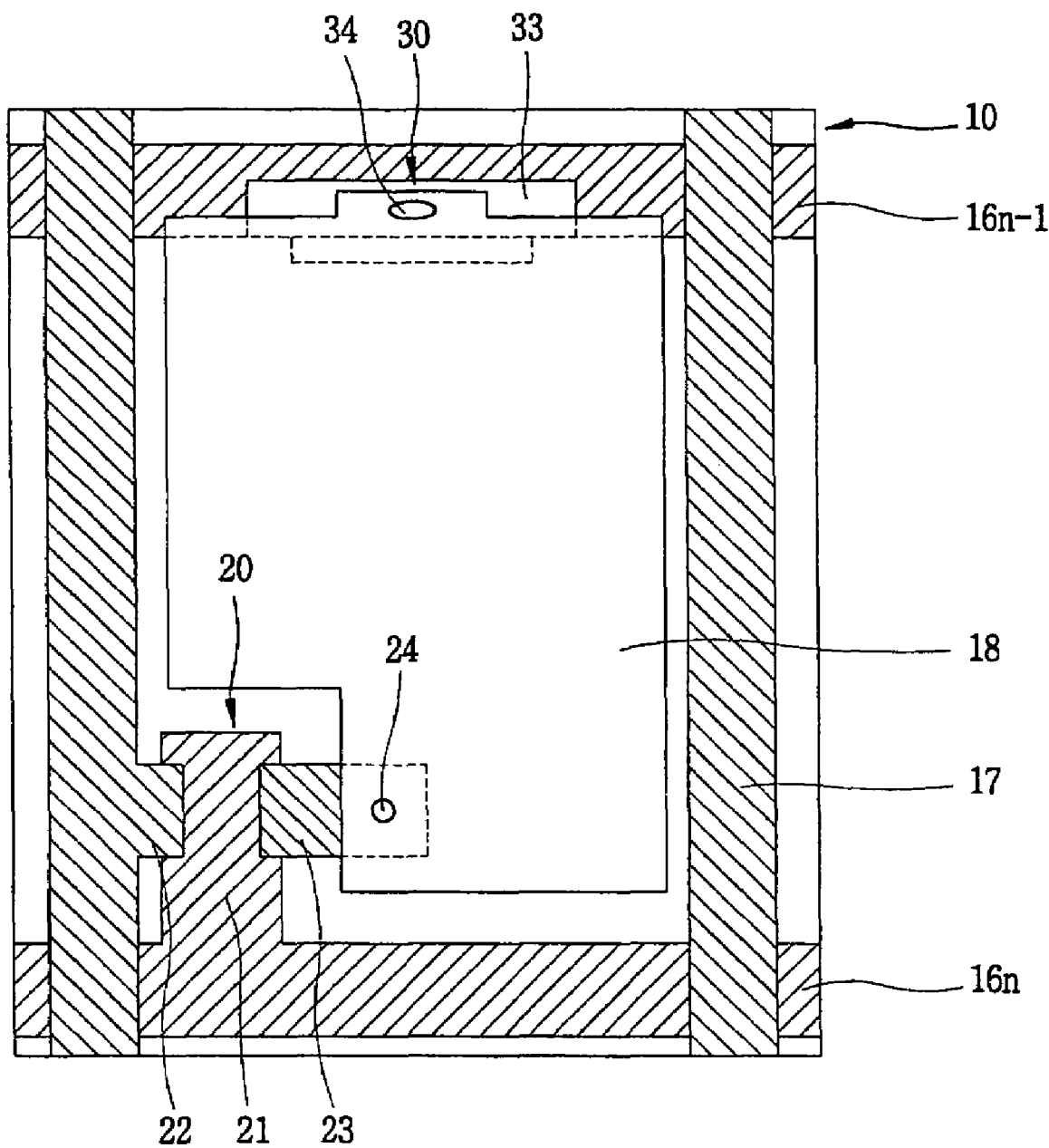
FIG. 1 is a plan view showing a part of an array substrate of a general LCD device.
Figure 2A:
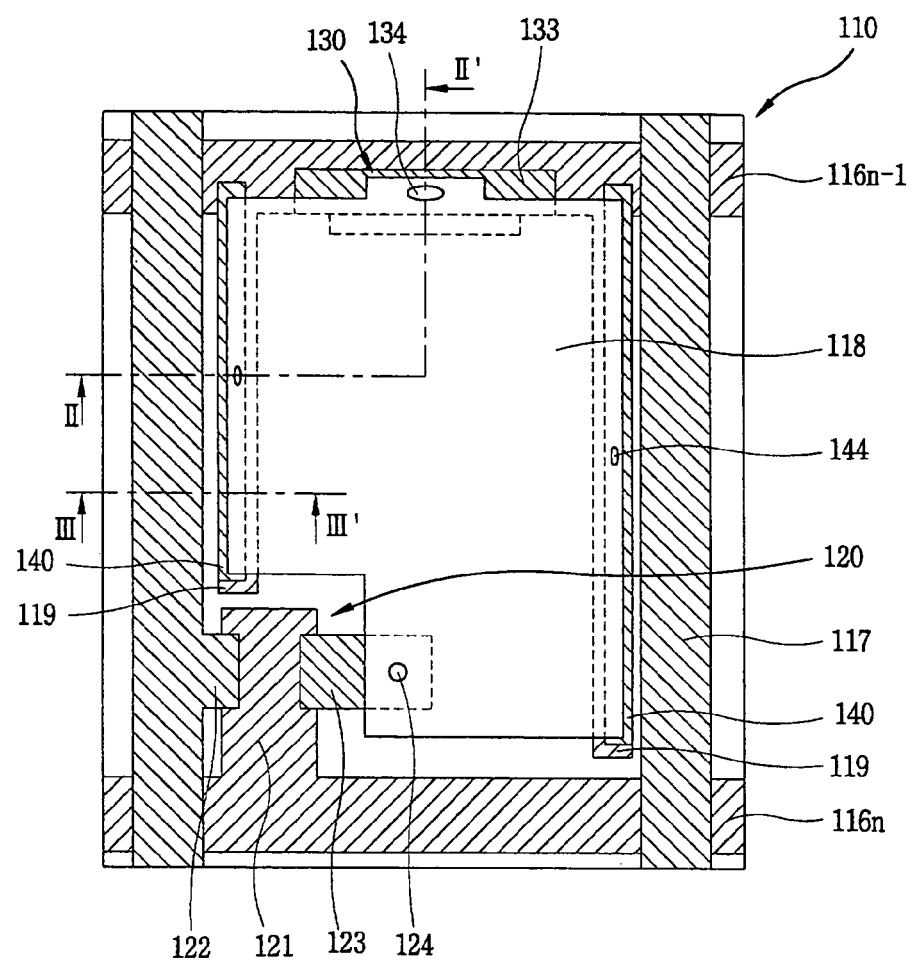
FIG. 2A is a plan view showing a part of the array substrate of the LCD device according to one embodiment.
Figure 2B:
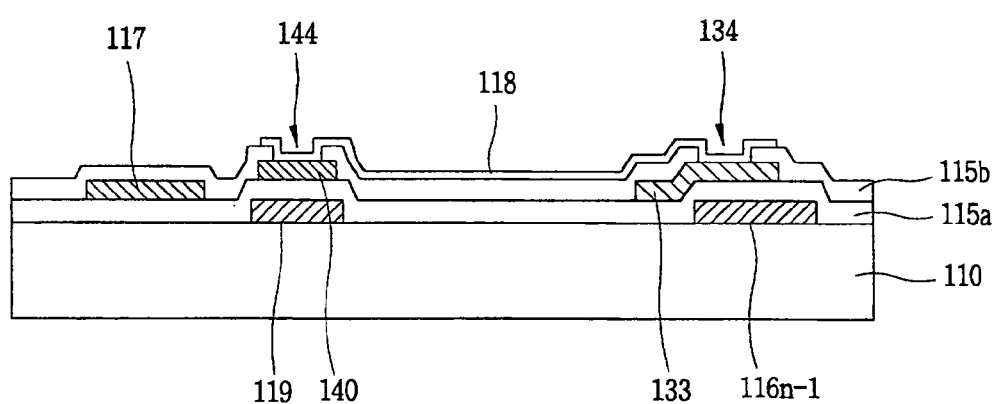
FIG. 2B is a sectional view taken along line II–II' of the array substrate of FIG. 2A.

FIG. 2A is a plan view showing a part of the array substrate of the LCD device according to one embodiment, and FIG. 2B is a sectional view taken along line II–II' of the array substrate of FIG. 2A.

While the LCD device has N×M pixels with N gate lines and M data lines crossing each other, only one pixel is illustrated in the drawing for the present explanation.

As shown, an array substrate 110 includes a gate line 116n to which an scanning signal is applied from an external driving circuit unit (not shown), a data line 117 to which an image signal is applied, a thin film transistor 120 as a switching device formed at the crossing of the gate line 116n and the data line 117, and a pixel electrode 118 connected to the thin film transistor 120.

The thin film transistor 120 includes a gate electrode 121 connected to the gate line 116n, a source electrode 122 connected to the data line, and a drain electrode 123 connected to the pixel electrode 118. The thin film transistor 120 includes a first insulating layer 115a for insulating the gate electrode 121 from the source/drain electrodes 122 and 123 and a semiconductor layer (not shown) that forms a conductive channel between the source electrode 122 and the drain electrode 123 when a gate voltage is supplied to the gate electrode 121.

A second insulating layer 115b is formed on the drain electrode 123 with a first contact hole 124. The drain electrode 123 and the pixel electrode 118 are electrically connected to each other through the first contact hole 124.

A part of the pixel electrode 118 overlaps with a part of a previous gate line 116n-1 to form a first storage capacitor 130 with the first insulating layer 115a interposed therebetween. The first storage capacitor 130 is formed by a first storage electrode 133 electrically connected to the pixel electrode 118 through the second contact hole 134 formed in the second insulating layer 115b and by the previous gate line 116n-1 overlapping the first storage electrode 133 with the first insulating layer 115a interposed therebetween.

A pair of gate dummy lines 119 are formed between the data line 117 and the pixel electrode 118 along a longitudinal direction of the data line 117. A part of the gate dummy line 119 is overlaps with the pixel electrode 118 of the pixel to form a second storage capacitor. Also, the gate dummy line 119 may be formed only at one side of the pixel electrode 118.

A data dummy line 140 is formed above the gate dummy line 119 along the gate dummy line 119. Also, the data dummy line 140 can be formed only at one side of the pixel electrode 118.

The data dummy line 140 is electrically connected to the pixel electrode 118 through a third contact hole 144 formed in the second insulating layer 115b. Therefore, the data dummy line 140 is connected to the pixel electrode 118 and partially overlaps the gate dummy line 119 with the first insulating layer 115a interposed therebetween to form a second storage capacitor.

The gate dummy line 119 and the data dummy line 140 are formed of an opaque metal material having a good conductive characteristic, and are arranged in an image non-display region between the data line 117 and the pixel region. Therefore, the gate dummy line 119 and the data dummy line 140 may act as a black matrix for preventing light from being leaked into the region.

In this embodiment, the gate dummy line 119 is formed a certain distance from the data line 117. However, it is also possible to partially overlap the gate dummy line 119 with the data line 117 in order to completely prevent light from leaking to the image non-display region.

The distance between the pixel electrode and the data line positioned at both sides of the pixel electrode may be changed due to an alignment error generated during a photolithography process. As a result, light leaks at the edge of the pixel due to a capacitance difference of right and left sides of the pixel at the time of turning on/off the pixel, thereby decreasing the picture quality. However, in the present embodiment, the shape and a structure of the data dummy line 140 may be controlled so that the same capacitance may be formed between the data line 117 and the pixel electrode 118 arranged at the right and left sides of the pixel. Therefore, this problem may be solved, which will be explained in more detail with reference to the fabrication process of the array substrate.

FIGS. 3A to 3D are exemplary views sequentially showing a fabrication process of the array substrate of FIG. 2B.

Figure 3A:
FIGS. 3A to 3D are exemplary views sequentially showing a fabrication process of the array substrate of FIG. 2B.

As shown in FIG. 3A, a gate line 116n-1 that applies a scanning signal to a pixel electrode (not shown) and a gate dummy line 119 are formed on a substrate 110 that is formed of a transparent insulating material such as glass. The gate dummy line 119 prevents light from leaking at the edge of a pixel electrode which will be later explained, and forms the pixel electrode and a second storage capacitor thus to obtain a sufficient capacitance.

The gate line 116n-1 and the gate dummy line 119 may be formed by depositing a metal material such as Al, Mo, an Al alloy, Cu, etc. on the substrate 110 using a deposition method such as sputtering and then by patterning.

Although not shown, a gate electrode 121 extending from a gate line 116n is formed at a device region where a thin film transistor is formed.

Figure 3B:
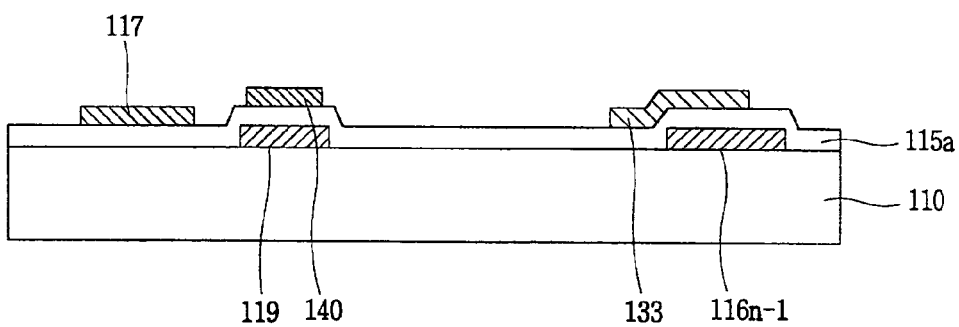

As shown in FIG. 3B, a first insulating layer 115a formed of a silicon oxidation layer or a silicon nitride layer is formed on the entire surface of the substrate 110 where the gate line 116n-1 and the gate dummy line 119 are formed.

Then, a data line 117 for applying an image signal, a data dummy line 140, and a first storage electrode 133 are formed on the first insulating layer 115a. The data dummy line 140 is formed to overlap with the gate dummy line 119 above the gate dummy line 119, and the first storage electrode 133 may be partially overlapped with the previous gate line 116n-1 in order to form a first storage capacitor.

Even though the data line 117 and the gate dummy line 119 are formed a certain distance apart in FIG. 3B, the data line 117 may partially overlap the gate dummy line 119.

Although not shown, a semiconductor layer is formed on the first insulating layer 115a by being patterned in the device region, and source/drain electrodes 122 and 123 are formed on the semiconductor layer.

In the present embodiment, the data dummy line 140 was formed of the same material as the data line 117 and in the same process by being patterned. However, the present invention is not limited to this. The data dummy line 140 may be formed of a different material from the data line 117 and may be formed in a different process.

Figure 3C:
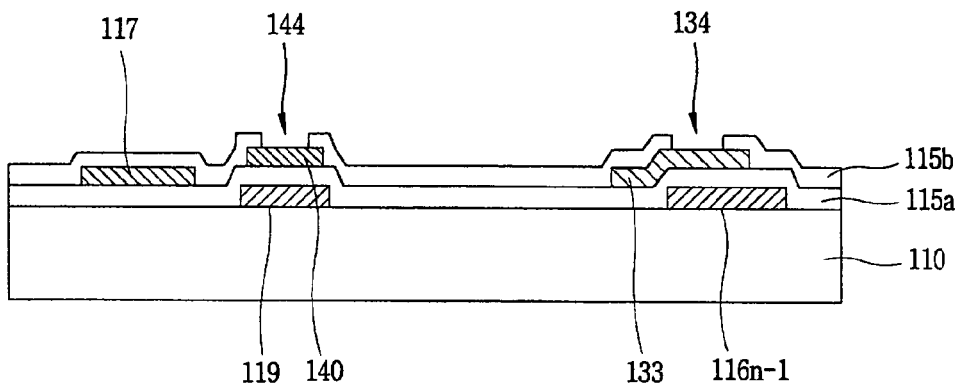

Next, as shown in FIG. 3C, a second insulating layer 115b is deposited on the entire surface of the substrate 110 where the data line 117, the data dummy line 140, and the first storage electrode 133 are formed. Then, a partial region of the second insulating layer 115b is removed by a photolithography process to form a second contact hole 134 exposing a part of the first storage electrode 133 and to form a third contact hole 144 for exposing a part of the data dummy line 140.

The second insulating layer 115b may be formed of an inorganic insulating layer such as a silicon oxidation layer or a silicon nitride layer or may be formed of an organic insulating layer having a small dielectric constant such as an acrylic based organic compound, Teflon, benzocyclobutene (BCB), cytop, perfluorocyclobutane (PFCB), etc.

Although not shown, a part of the second insulating layer 115b inside the device region is removed thereby to form a first contact hole 124 exposing a part of the drain electrode 123.

Figure 3D:
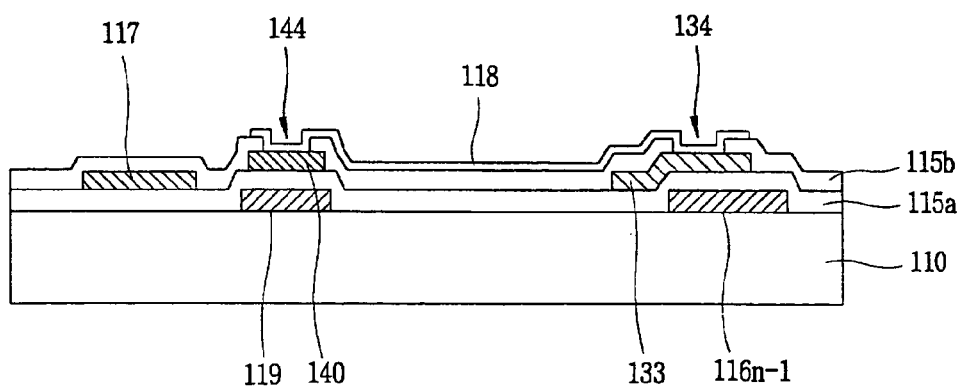

Then, as shown in FIG. 3D, a transparent conductive material is deposited on the entire surface of the substrate 110 and then is patterned, thereby forming a pixel electrode 118. A part of the pixel electrode 118 is electrically connected to the first storage electrode 133 through the second contact hole 134, and a part of the pixel electrode 118 is electrically connected to the data dummy line 140 through the third contact hole 144. Although not shown, a part of the pixel electrode 118 inside the pixel region is electrically connected to the drain electrode 123 through the first contact hole 124.

The first storage electrode 133 connected to the pixel electrode 118 partially overlaps the previous gate line 116n−1 with the first insulating layer 115b in between to form a first storage capacitor. A second storage capacitor is formed between the gate dummy line 119 and the pixel electrode 118 or between the gate dummy line 119 and the data dummy line 140.

Because the data dummy line 140 is electrically connected to the pixel electrode 118 through the third contact hole 144, a storage capacitor between the gate dummy line 119 and the pixel electrode 118 is equal to a storage capacitor between the gate dummy line 119 and the data dummy line 140.

The reason why the data dummy line 140 is connected to the pixel electrode 118 to form the storage capacitor is in order to increase a capacitance of the storage capacitor, which will be explained as follows.

In the present embodiment, a capacitance formed between the data dummy line 140 and the gate dummy line 119 is determined by the following formula 2.

$$C = \epsilon A/d \quad \text{[Formula 2]}$$

Herein, C denotes a capacitance between the data dummy line 140 and the gate dummy line 119, A denotes an area of an overlapped region, d denotes a thickness of a dielectric substance, that is, a distance between the overlapped data dummy line 140 and the gate dummy line 119.

As shown in formula 2, the capacitance may be increased by reducing the thickness of a dielectric substance. Therefore, if the data dummy line 140 is used as a capacitor electrode for forming the capacitor instead of the gate dummy line 119 with the pixel electrode 118, the thickness of a dielectric substance is substantially decreased. The thickness of a dielectric substance may be reduced by using a dielectric substance composed of only the first insulating layer 115a. Accordingly, the capacitance is increased and thereby the picture quality of the LCD device is improved.

In the LCD device according to the present embodiment, the storage capacitor is formed not only in the gate line region by storage on the gate structure but also in the overlapped region between the data dummy line and the gate dummy line to be able to obtain a sufficient amount of capacitance. Therefore, a voltage of the pixel electrode may be maintained more stably.

Regions where light leaks is caused by a horizontal electric field extending from the pixel electrode 118 to the gate dummy line 119 that can be reduced by shielding a gap between the gate dummy line 119 and the pixel electrode 118 by forming the data dummy line 140. A horizontal electric field applied to the pixel is reduced by an electric field towards the data dummy line 140 from the gate dummy line 119, thereby preventing the light from leaking. An electric field towards a common electrode of a color filter substrate (not shown) from the gate dummy line 119 does not induce a disclination of liquid crystal so it does not cause a light leakage phenomenon.

Hereinafter, the reduction of the light leakage of the LCD device by forming the data dummy line will be explained in more detail using simulation results.

Figure 4A:
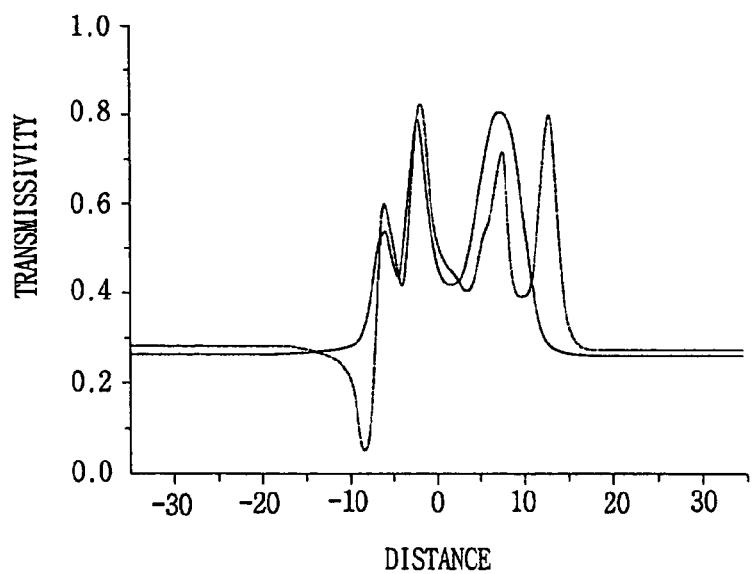
FIG. 4A is a graph showing an optical transmissivity according to a distance from a data line in the LCD device of FIG. 2A.
Figure 4B:
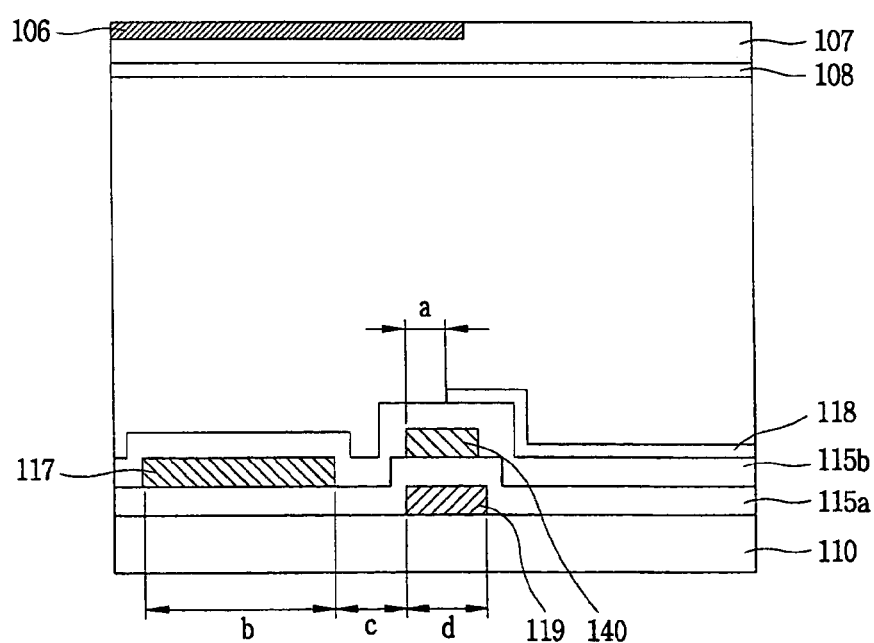
FIG. 4B is an exemplary view showing a sectional surface of the array substrate and the corresponding color filter substrate with regard to the transmissivity graph of FIG. 4A.

FIG. 4A is a graph showing optical transmissivity versus a distance between the data line and the pixel electrode in the LCD device of FIG. 2A, and FIG. 4B is an exemplary view showing a sectional view of the array substrate and the corresponding color filter with regard to the transmissivity graph of FIG. 4A. FIG. 4B shows the structure of the LCD device used in the simulation of FIG. 4A, which is the same structure as the LCD device illustrated in FIG. 2A.

Herein, the distances labeled a, b, c, and d illustrated in FIG. 4B are equal to 2, 9, 3.5, and 4 μm, respectively for the simulation.

As shown in FIG. 4A, the graph shows an optical simulation result, in which the dotted line shows a case where the data dummy line 140 is not formed and the solid line shows an optical transmissivity of a case where the data dummy line is formed. The horizontal axis of the graph denotes a distance from the right and left side of the pixel electrode 118 to the center axis of the data line 117, and is expressed in μm.

In FIG. 4B, the end of the pixel electrode 118 is spaced from the center of the data line 117 by approximately 10 μm. In the case where the data dummy line 140 is not formed, a peak exists at the inside from the edge of the pixel electrode 118 at approximately 2 μm. This means that an unnecessary horizontal electric field exists at the edge of the pixel electrode 118. On the other hand, in case where the data dummy line 140 is formed, the peak at the edge of the pixel electrode 118 disappears.

Therefore, in the case where the data dummy line 140 is not formed, a black matrix 106 has to be extended in to a certain region of the pixel electrode 116 (i.e., at the edge of the pixel electrode 118 where a light leakage is generated). On the other hand, in the case where the data dummy line 140 is formed, the black matrix 106 is not required to be extended into the pixel electrode 118. As a result, the light leakage phenomenon at the edge of the pixel electrode 118 is prevented and an aperture ratio is increased.

Figure 5:
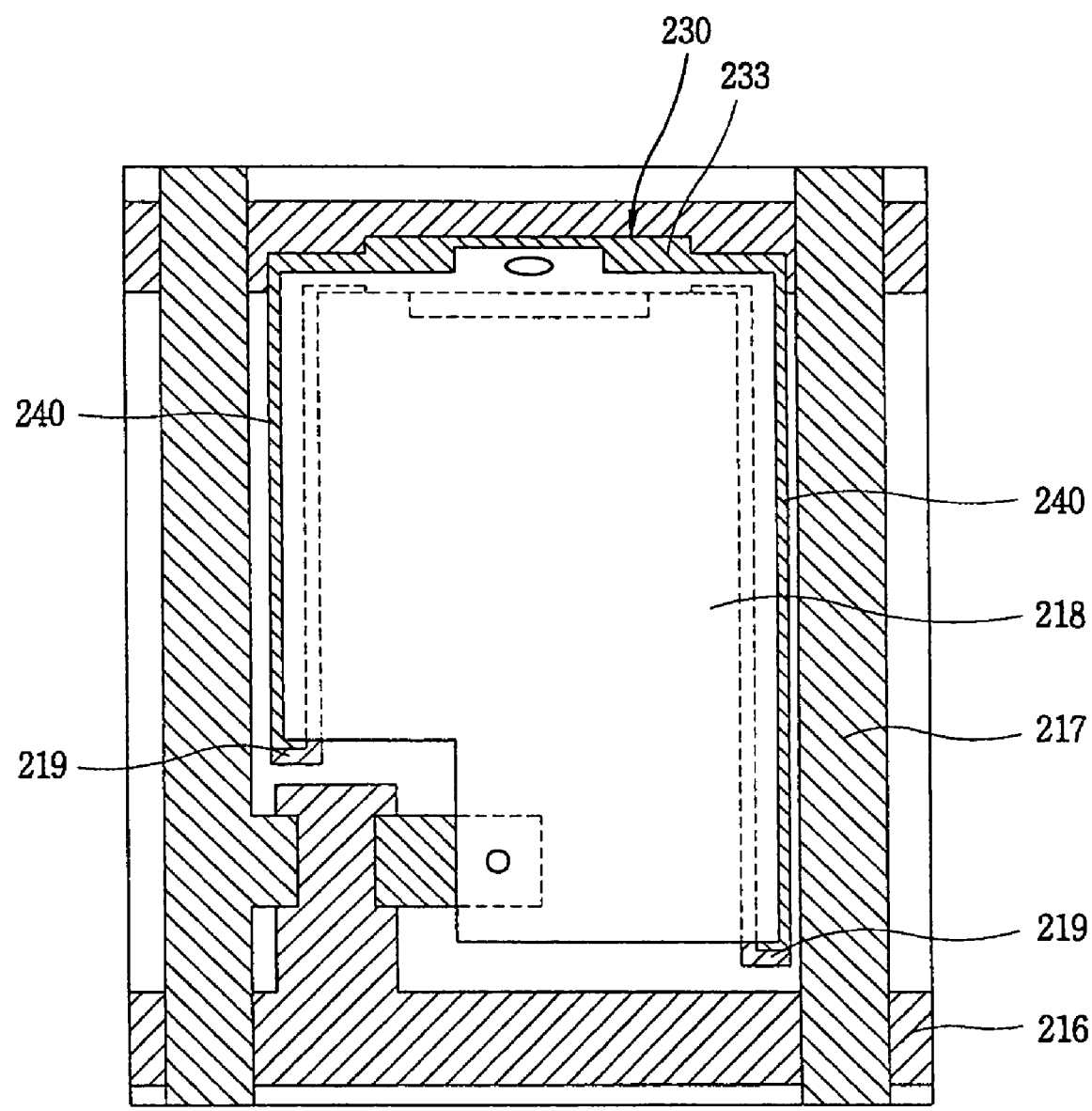
FIG. 5 is a plan view showing a part of the array substrate of an LCD device according to a second embodiment.

FIG. 5 is a plan view showing a part of the array substrate of an LCD device according to a second embodiment of the present invention.

The LCD device of the second embodiment has the same structure as the first embodiment of the LCD device illustrated in FIG. 2 except the structure of the data dummy line and a connection method of the pixel electrode and the data dummy line. Therefore, explanations of parts with the same construction as the LCD device of FIG. 2 will be omitted.

As shown in FIG. 5, a data dummy line 240 is formed above and along a gate dummy line 219. While FIG. 5 shows the data dummy line 240 formed at both sides of the pixel electrode 218, the data dummy line 240 may be formed only at one side of the pixel electrode 218.

The data dummy line 240 prevents light from leaking through a gap between a data line 217 and the pixel electrode 218.

In the present embodiment, the data dummy line 240 is extended along a lengthwise direction of the gate line 216 to be connected to a first storage electrode 233 that forms a first storage capacitor 230. Therefore, unlike the first embodiment, it is not necessary to form a third contact hole for an electrical connection between the data dummy line 240 and the pixel electrode 218.

If the data dummy line 240 is extended along the lengthwise direction of the gate line 216, the capacitance of a second storage capacitor is increased according to an overlapped region between a part of the data dummy line 240 and the gate line 216 when compared to the LCD device of the first embodiment. As the result, the picture quality of the LCD device may be further improved.

In the LCD device according to the first embodiment and the second embodiment, the first storage capacitor is formed by a storage on gate structure. However, the present invention is not limited to this. The first storage capacitor may be formed by a storage on common structure, which will be explained in more detail with reference to a third embodiment of the present invention.

Figure 6A:
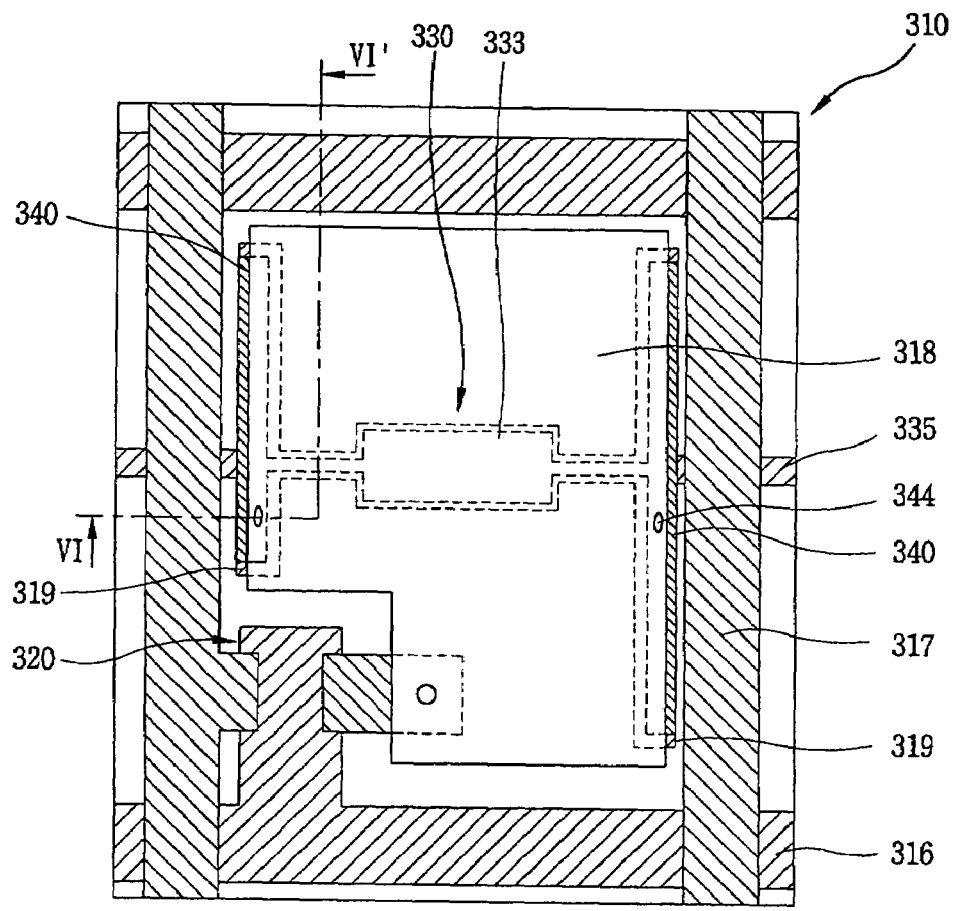
FIG. 6A is a plan view showing a part of the array substrate of an LCD device according to a third embodiment.
Figure 6B:
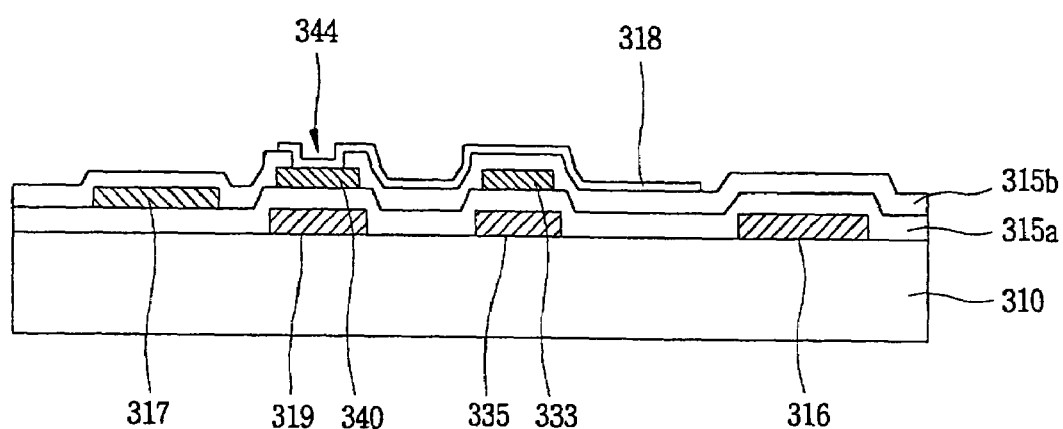
FIG. 6B is a sectional view taken along line VI–VI' of the array substrate of FIG. 6A.

FIG. 6A is a plan view showing a part of the array substrate of an LCD device according to a third embodiment of the present invention, and FIG. 6B is a sectional view taken along line VI–VI' of the array substrate of FIG. 6A.

As shown in FIG. 6A, an array substrate 310 includes a gate line 316 to which a scanning signal is applied from an external driving circuit unit (not shown), a data line 317 to which an image signal is applied, a thin film transistor 320 as a switching device formed at a crossing region between the gate line 316 and the data line 317, and a pixel electrode 318 connected to the thin film transistor 320.

A pair of gate dummy lines 319 are formed at the edge of the pixel electrode 318 along a lengthwise direction of the data line 317 partially overlapping the pixel electrode 318. The pair of gate dummy lines 319 are connected to a storage line and the storage line is formed in the same direction as the gate line 316.

Even though the gate dummy line 319 is formed on both sides of the pixel electrode 318 in the drawing, the gate dummy line 319 may be formed only at one side of the pixel electrode 318.

A data dummy line 340 is formed above the gate dummy line 319 along the gate dummy line 319. Even though the data dummy line 340 is formed on both sides of the pixel electrode 318 like the gate dummy line 319 in the drawing, the data dummy line 340 may be formed only at one side of the pixel electrode 318.

The data dummy line 340 extends into the pixel region to constitute a first storage electrode 333.

A first storage capacitor 330 of a storage on common structure is formed between the pixel electrode 318 and a storage line 335 arranged in the pixel region. That is, the storage line 335 partially overlaps the pixel electrode 318 with a first insulating layer (not shown) and a second insulating layer (not shown) interposed therebetween, thereby forming the first storage capacitor 330.

A second storage capacitor is formed where the first storage electrode 333 and the storage line 335 overlapped where the data dummy line 340 and the gate dummy line 319 overlap or in the pixel region.

As shown in FIG. 6B, the gate line 316, the storage line 335, and the gate dummy line 319 are formed on the array substrate 310. A first insulating layer 315a is formed on the entire surface of the substrate 310.

The data line 317, the data dummy line 340, and the first storage electrode 333 are formed on the first insulating layer 315a. A second insulating layer 315b is formed on the entire surface of the substrate 310. On the second insulating layer 315b, the pixel electrode 318 which is a transparent electrode is formed. The pixel electrode 318 is electrically connected to the data dummy line 340 through a contact hole 344 formed at the second insulating layer 315b.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A liquid crystal display (LCD) device comprising:
   a plurality of gate lines and data lines defining a plurality of pixel regions;
   a switching device formed at a crossing region between each gate line and data line;
   a pixel electrode formed in the pixel region;
   a gate dummy line at one side of the pixel electrode along the data line and partially overlapping the pixel electrode; and
   a data dummy line at one side of the pixel electrode above the gate dummy line and partially overlapping with the pixel electrode.

2. The LCD device of claim 1, wherein the switching device is a thin film transistor.

3. The LCD device of claim 2, wherein the thin film transistor includes:
   a gate electrode formed on a substrate and connected to a gate line;
   a first insulating layer formed on the entire substrate where the gate electrode is formed;
   a semiconductor layer formed on the first insulating layer;
   a source and drain electrode formed on the semiconductor layer and respectively connected to a data line and a pixel electrode; and
   a second insulating layer formed on the entire substrate where the source and drain electrode are formed.

4. The LCD device of claim 3, wherein the data dummy line is electrically connected to the pixel electrode through a first contact hole in the second insulating layer.

5. The LCD device of claim 1, wherein the gate dummy line is formed of the same material as the gate line.

6. The LCD device of claim 1, wherein the data dummy line is formed of the same material as the data line.

7. The LCD device of claim 1 further comprising a storage electrode arranged along an adjacent gate line of an adjacent pixel thus forming a storage capacitor with the gate line.

8. The LCD device of claim 7, wherein the data dummy line is connected to the storage electrode.

9. The LCD device of claim 1 further comprising a pair of electrodes arranged in the pixel region and forming a storage capacitor.

* * * * *